United States Patent [19]

Asa

[11] Patent Number: 5,493,216
[45] Date of Patent: Feb. 20, 1996

[54] MAGNETIC POSITION DETECTOR

[75] Inventor: Yukihiro Asa, Tokyo, Japan

[73] Assignee: Asa Electronic Industry Co., Ltd., Tokyo, Japan

[21] Appl. No.: 181,982

[22] Filed: Jan. 14, 1994

[30] Foreign Application Priority Data

Sep. 8, 1993 [JP] Japan .................................. 5-246052
Oct. 4, 1993 [JP] Japan .................................. 5-269487

[51] Int. Cl.$^6$ .............................. G01B 7/14; G01B 7/30; G01R 33/06; H01L 43/06
[52] U.S. Cl. ................................. 324/207.2; 324/207.24; 324/251; 338/32 H
[58] Field of Search ........................ 324/207.2, 207.21, 324/207.23, 207.24, 207.25, 117 H, 207.26, 235, 225, 174, 207.11–207.13, 251, 262; 338/32 R, 32 H; 73/DIG. 3

[56] References Cited

U.S. PATENT DOCUMENTS

| | | | |
|---|---|---|---|
| 3,041,416 | 6/1962 | Kuhrt | 338/32 H |
| 3,170,323 | 2/1965 | Kuhrt et al. | 324/207.2 X |
| 4,731,579 | 3/1988 | Petersen et al. | 338/32 H X |
| 4,966,041 | 10/1990 | Miyazaki | 324/207.2 X |
| 5,229,715 | 7/1993 | Niino et al. | 324/207.25 X |

FOREIGN PATENT DOCUMENTS

| | | | |
|---|---|---|---|
| 2745880 | 4/1978 | Germany | 324/207.2 |
| 1035407 | 8/1983 | U.S.S.R. | 324/207.2 |
| 1136700 | 12/1968 | United Kingdom | 324/207.2 |

Primary Examiner—Sandra L. O'Shea
Assistant Examiner—Jay M. Patidar
Attorney, Agent, or Firm—Flynn, Thiel, Boutell & Tanis

[57] ABSTRACT

A magnetic position detector including a magnetic field generating element and a magnetic field detector that are arranged together so that a field generating element can be longitudinally positioned relative to the detector. The magnetic field generating element includes first, second and third longitudinally axially lined magnets. The second and third magnets are located adjacent the opposed ends of the first magnet and are spaced apart from the first magnet. The magnets are arranged so that the first magnet has a first polarity and the second and third magnets have an opposed polarity. The magnets are spaced apart to define inter-magnet gaps. The magnetic field detector includes a Hall element sensitive to the magnetic flux generated by the magnets. A power supply supplies a small bias voltage to produce an offset Hall effect output signal. The bias voltage is adjusted so that the Hall element output signal switches polarity as the Hall element passes over the inter-magnet gaps.

14 Claims, 8 Drawing Sheets

MAGNETIC POSITION DETECTOR

FIELD OF THE INVENTION

The present invention relates to a Hall effect type sensor comprising a magnetic field generating section having permanent magnets constituting an examined body and a magnetic field detecting section having a Hall element sliding relatively to the magnetic field generating section to detect the magnetic field generated by the magnetic field generating section.

BACKGROUND OF THE INVENTION

Recently Hall effect position sensors, in which permanent magnets and Hall elements are combined, are applied in various sorts of mechanical apparatuses, electric/electronic apparatuses, automation apparatuses, etc. In such a Hall effect type position sensor a magnetic field generating section is constructed by mounting permanent magnets on an examined body, whose position is to be detected and a magnetic field detecting section consisting of a Hall element is constructed so as to be slidable relatively with respect to the magnetic field generating section. The position of the examined body is detected owing to the fact that the Hall element in the magnetic field detecting section detects the magnetic field generated by the magnetic field generating section by Hall effect, when the magnetic field generating section and the magnetic field detecting section are close to each other by generating an electric signal.

Hall effect is observed by a Hall element that consists of a semiconductor thin film 20 such as InSb. When a current I is made to flow in a certain direction through this semiconductor thin film 20 and a magnetic field H is applied to the film in a direction perpendicular to the direction of the current I, as indicated in FIG. 6, a Hall voltage Vh is generated in a direction perpendicular to both the current I and the magnetic field H. The Hall voltage Vh is proportional to the product of the current I and the magnetic field. Thus, it is possible to generate a Hall voltage Vh, i.e. electric signal, corresponding to the intensity of the magnetic field, by application of the magnetic field to the Hall element. This makes it possible to detect the position of the examined body subject to necessary control operations such as stop of the examined body at that position, etc. Since a Hall effect position sensor constructed by using such a Hall element for the magnetic field detecting section has an advantage that it has a high reliability, because it has no mechanical contacts such as microswitches, etc. and that it works without contact with the examined body, it is applied in a widely extended field.

A prior art example of such a Hall effect type position sensor there is disclosed in JP Utility Model-A-Hei 1-81837. In this construction, as illustrated in FIG. 7, the magnetic field generating section 24 is constructed by a magnet 23 consisting of two magnetic elements 21 and 22 magnetized partially in different directions. This magnetic field generating section 24 and a magnetic field detecting section 25 consisting of a Hall element are slid relatively in a magnetic flux direction 26 with an operation distance h.

Another prior art Hall element disclosed in JP Utility Model-A-Hei 1-100348. In this construction, illustrated in FIG. 8, a permanent magnet 32 is mounted on a piston 31 the position of which is to be detected. More specifically two magnetic bodies 33 are mounted on the two ends on the piston in the slide direction to construct the magnetic field generating section 34. The magnetic field detecting section 37 consisting of a Hall element 36 is relatively slid with respect to the magnetic field generating section 34 through a cylinder tube 35. In each of these prior art examples the Hall voltage Vh outputted by the Hall element is amplified by an amplifier and further compared with a reference value by a comparator. In this way a switching operation is effected and a control signal is outputted to the examined body.

These prior art Hall effect type position sensors have a problem in that deviations of the detection position in the slide direction can become significant in situations where the operational distance between the magnetic field generating section and the magnetic field detecting section varies.

For example, in the prior art example indicated in FIG. 7, since variations in the operation distance h between the magnetic field generating section 24 and the magnetic field detecting section 25 sometimes cannot be avoided, when the distance h varies, detection precision is lowered, because the detection position in the slide direction 26 deviates.

OBJECT OF THE INVENTION

A first object of the present invention is to provide a Hall effect type sensor so constructed that deviations of the detection position in the slide direction can be held to a minimum, even in the case where the operational distance between the magnetic field generating section and the magnetic field detecting section varies.

A second object of the present invention is to provide a small and cheap Hall effect type sensor suitable for linear displacement detection, wherein it is unnecessary to employ complicated circuit construction.

SUMMARY OF THE INVENTION

In order to achieve the above first object, a Hall effect type sensor according to the present invention comprises a magnetic field generating section including permanent magnets attached to an examined body and a magnetic field detecting section that is slid relative with respect to the magnetic field generating section that includes a Hall element for detecting magnetic fields generated by the magnetic field generating section. The magnetic field generating section includes a first permanent magnet, and second and third permanent magnets, which are located at the opposed ends of the first permanent magnet with equal gaps along the slide direction and which are smaller than the first permanent magnet in the length direction. The second and the third permanent magnets are magnetized so as to have a common polarity opposite the polarity of the first permanent magnet.

In the sensor described above, the first, the second and the third permanent magnet are held in one body.

In either one of the sensors described above, a predetermined bias voltage may be applied to an output voltage of the Hall element incorporated into the magnetic field detecting section so that the Hall element has an almost linear output characteristic curve.

In either one of the sensors described above, the first, the second and the third permanent magnets may be housed in one non-magnetic case, mounted on a mounting plate in one body.

In the sensor described above, the mounting plate may be made of a ferromagnetic material.

In the sensor described above, a mark indicating a working domain may be disposed on the non-magnetic case.

In the sensor described above, oblong mounting holes may be formed in the mounting plate.

In order to achieve the above second object, a linear displacement detecting Hall effect type for detecting the displacement of an examined body that generates electric signals according to the present invention includes a magnetic field generating section including a first permanent magnet and a second permanent magnet magnetized so as to have a polarity opposite to that of the first permanent magnet, which are secured to an examined body. The invention also includes a magnetic field detecting section that is relative the magnetic field generating section in a displacement direction that includes a Hall element for detecting magnetic field generated by the magnetic field generating section while keeping a constant operation distance therefrom to output electric signals.

In the linear displacement detecting Hall effect type sensor described above, the second permanent magnet may be combined with the first permanent magnet through a magnetic body.

Owing to the first construction according to the present invention, in which the magnetic field generating section is constructed by a first permanent magnet, and second and third permanent magnets located at the opposed ends of the first permanent magnet with equal gaps along the slide direction and which are smaller than the first permanent magnet in the length direction, the second and the third permanent magnet being magnetized so as to have a polarity opposite to that of the first permanent magnet, it is possible to maintain small deviations of detection position in the slide direction, even in the case where operation distance between the magnetic field generating section and the magnetic field detecting section varies.

According to the construction of the first modified example, owing to the fact that the first, the second and the third permanent magnet are held in one body, it is possible to obtain effects similar to those obtained by said first construction.

According to the construction of the second modified example, owing to the fact that a predetermined bias voltage is added to an output voltage of the Hall element constituting the magnetic field detecting section so that the Hall element has an almost linear output characteristic curve, it is possible to obtain effects similar to those obtained by said first construction.

According to the construction of the third modified example, owing to the fact that the first, the second and the third permanent magnet are accommodated in one non-magnetic case, mounted on a mounting plate in one body, it is possible to obtain effects similar to those obtained by said first construction.

According to the construction of the fourth modified example, owing to the fact that the mounting plate is made of a ferromagnetic material, it is possible to obtain effects similar to those obtained by said first construction.

According to the construction of the fifth modified example, owing to the fact that a mark indicating a working domain may be disposed on the non-magnetic case, it is possible to obtain effects similar to those obtained by said first construction.

According to the construction of the sixth modified example, owing to the fact that oblong mounting holes are formed in the mounting plate, it is possible to obtain effects similar to those obtained by said first construction.

Owing to the second construction according to the present invention, in which it comprises the magnetic field generating section consisting of a first permanent magnet and a second permanent magnet magnetized so as to have a polarity opposite to that of the first permanent magnet, which constitute an examined body and the magnetic field detecting section slid relatively with respect to the magnetic field generating section in a displacement direction and consisting of a Hall element for detecting magnetic field generated by the magnetic field generating section while keeping a constant operation distance therefrom to output electric signals, it is possible to detect displacement of the examined body by means of a simple construction.

DETAILED DESCRIPTION

Figure 1:
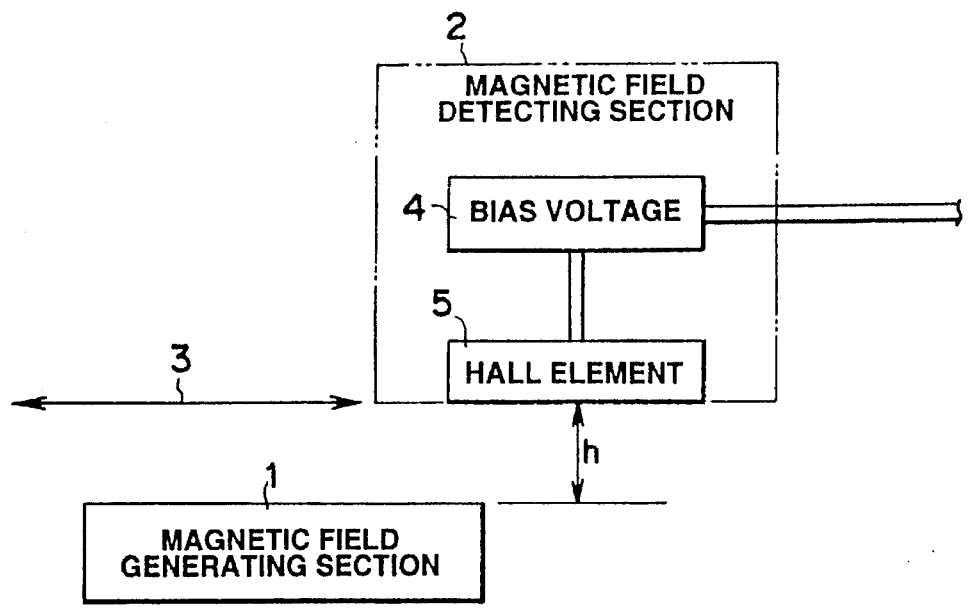
FIG. 1 is a schematic diagram showing the construction of an embodiment of the Hall effect type sensor according to the present invention.

Hereinbelow several embodiments of the present invention will be explained, referring to the drawings.

FIG. 1 is a schematic diagram showing a first embodiment of the Hall effect type position sensor according to the present invention, in which reference numeral 1 is a magnetic field generating section including permanent magnets constituting an examined body and 2 is a magnetic field detecting section slide relatively with respect to the magnetic field generating section 1 in a displacement direction 3 and consisting of a Hall element 5 detecting magnetic field generated by the magnetic field generating section 1 while keeping an operation distance h. Power supply 4 supplies a bias voltage applied to the output voltage of the Hall element 5 in the magnetic field generating section 2, as described later. As stated previously, a semiconductor thin film such as InSb is used as the Hall element 5 of the magnetic field detecting section 2.

Figure 2:
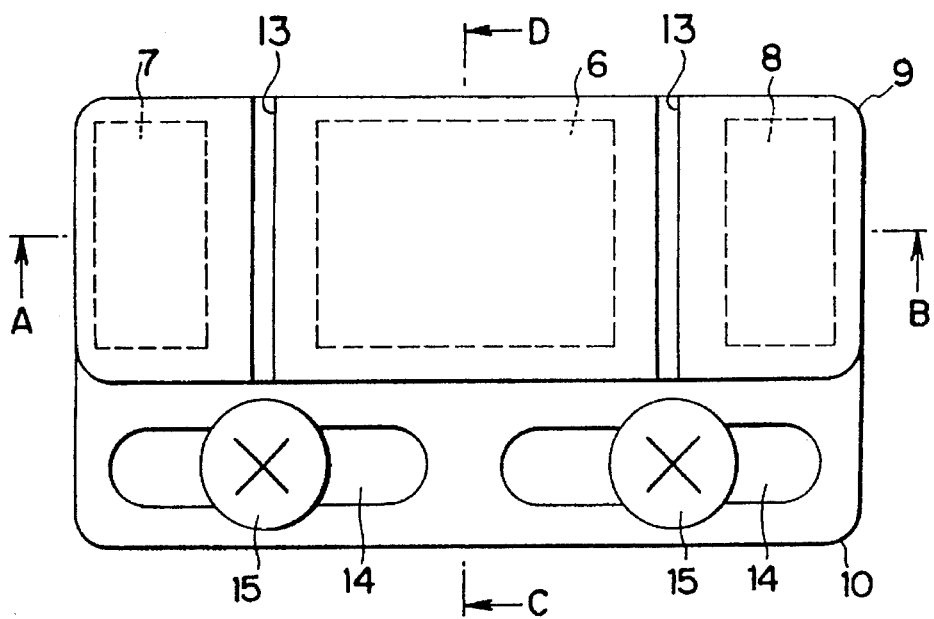
FIG. 2 is a plan view showing the construction of the magnetic field generating section of the Hall effect type sensor in the embodiment indicated in FIG. 1.
Figure 3:
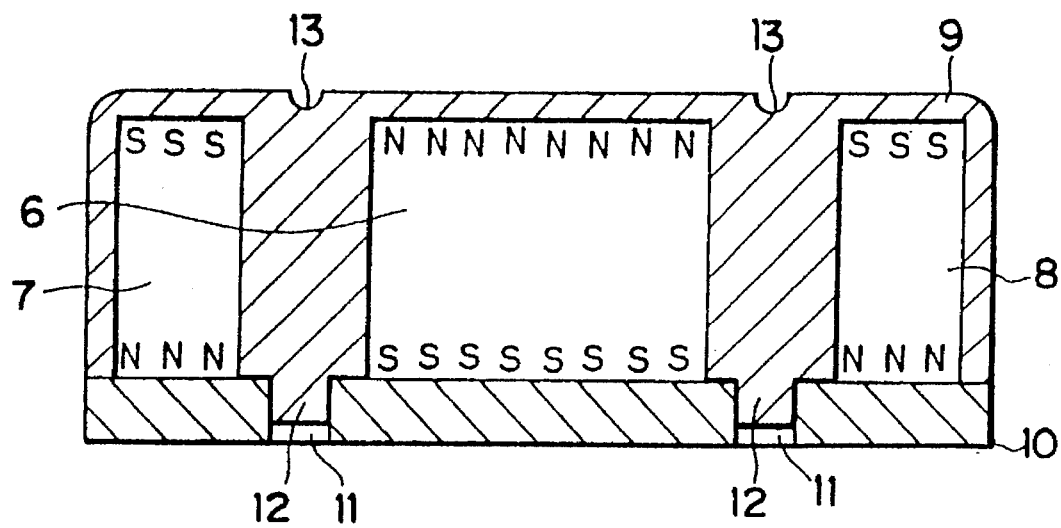
FIG. 3 is a cross-sectional view along a line A-B in FIG. 2.
Figure 4:
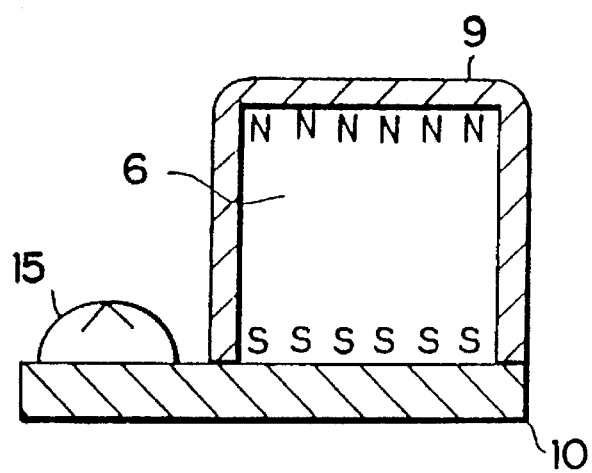
FIG. 4 is a cross-sectional view along a line C-D in FIG. 2.
Figure 5:
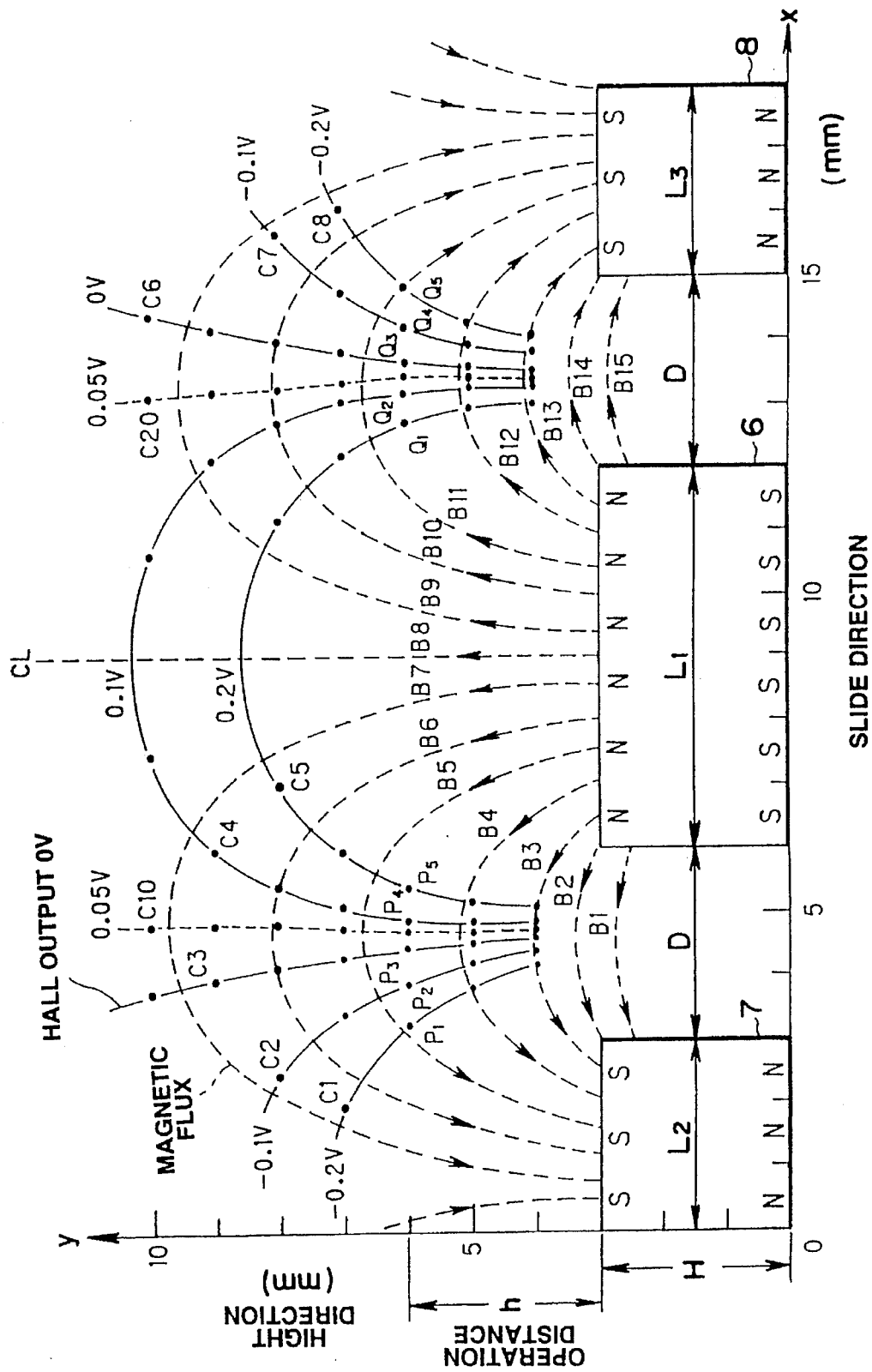
FIG. 5 is a characteristic diagram for a Hall output obtained by the Hall effect type position sensor in the embodiment indicated in FIG. 1.
Figure 6:
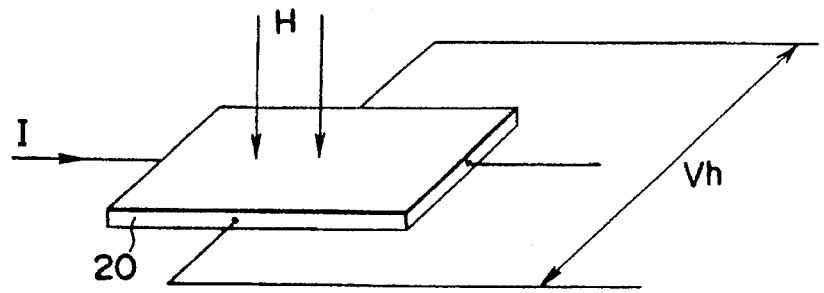
FIG. 6 is a schematic diagram for explaining Hall effect.
Figure 7:
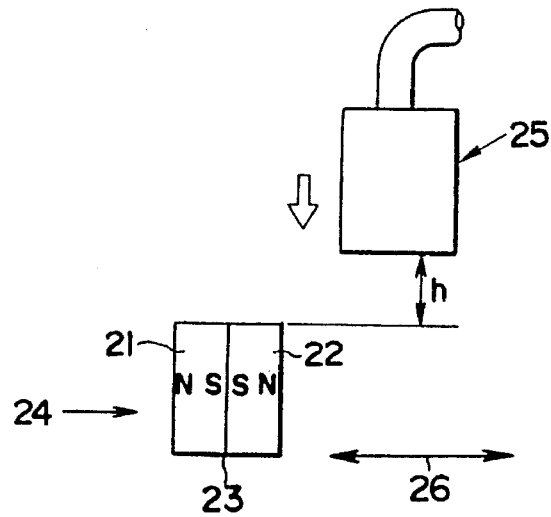
FIG. 7 is schematic diagram showing the construction of a prior art Hall effect type position sensor.
Figure 8:
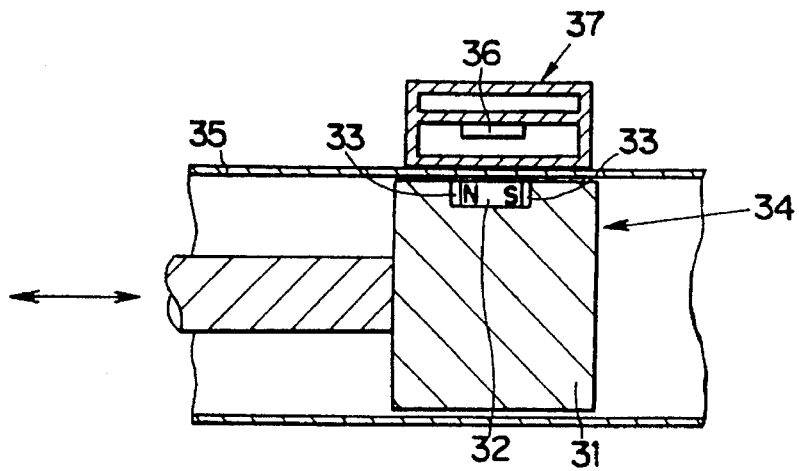
FIG. 8 is a schematic diagram showing the construction of another prior art Hall effect type position sensor.

FIGS. 2 to 4 show a concrete construction of the magnetic field generating section 1, FIG. 2 is a plan view, FIG. 3 is a cross-sectional view along a line A-B in FIG. 2, FIG. 4 being a cross-sectional view along a line C-D in FIG. 2. A first permanent magnet 6 consisting of an anisotropic Ba ferrite magnet having a great coercive force. Second and a third permanent magnets 7 and 8, respectively, made of a same material as the first permanent magnet, which are located on the opposed sides of the first permanent magnet 6 in the slide direction 3 with an equal gap D (refer to FIG. 5) and smaller than the first permanent magnet in the length direction. The second and third permanent magnets 7 and 8 are magnetized so as to have a polarity opposite to the polarity of the first permanent magnet 6. Denoting the lengths of the first, the second and the third permanent magnet 6, 7 and 8 by $L_1$, $L_2$ and $L_3$, respectively, the height by H, and the width in the direction perpendicular to the sheet of figure by W, these dimensions are set as an example as follows: $L_1$=6 mm, $L_2$=$L_3$=3 mm, H=3 mm, W=6 mm and D=3 mm. FIG. 5 shows magnetic flux generated by the permanent magnets 6, 7 and 8 by broken lines B1, B2, B3 . . . together with characteristic curves of the Hall output (voltage) obtained experimentally by the magnetic field generating section 1 by solid lines C1, C2, C3, . . . These are shown for an example, where the magnetic field detecting section 2 is slid at a height position, keeping an operation distance h from the permanent magnets 6, 7 and 8. The abscissa (x-axis) represents the slide direction and the ordinate (y-axis) indicates the height direction.

The permanent magnets 6, 7 and 8 are accommodated in a non-magnetic case 9 such as a plastic case and mounted on a mounting plate 10 made of a non-magnetic or ferromagnetic material in one body. Positioning holes 11 are formed previously in the mounting plate 10. The permanent magnets 6, 7 and 8 are adhered to the non-magnetic case 9 and the mounting plate 10 in one body by using adhesive in a state, where protruding portions 12 formed at the bottom portion of the non-magnetic case 9 are positioned by these holes 11. Grooves 13 are formed in the upper surface of case 9 serve as marks that indicate the position along the case at which the output signal from the detecting section 2 is switched. The mounting plate 10 is preferably made of a ferromagnetic material such as a soft steel for a reason of characteristics, as described later. Oblong mounting holes 14 are formed in the mounting plate 10 in the slide direction. The mounting plate 10 is secured to the examined body by screwing mounting screws in these mounting holes 14. This securing position is adjustable by sliding the mounting plate 10 along the mounting holes 14.

In FIG. 5, the solid lines C1, C2, C3, . . . indicate characteristic curves, for which Hall outputs are 0 V, ±0.1 V, ±0.2 V . . . , respectively. Magnetic fluxes represented by the broken lines B1, B2, B3, . . . are estimated, starting from the group of characteristic curves for the Hall output, to be plotted. These characteristic curves and magnetic fluxes are indicated symmetrically in the right and left direction with respect to the center portion CL of the first permanent magnet 6. Since the surface of the Hall element 5 in the magnetic field detecting section 2 approaching the permanent magnets 6, 7 and 8, is held at an operational distance h above the magnetic field generating section 1 and is held perpendicularly to the y-axis, the Hall output is proportional to the magnetic flux density B in the perpendicular direction. On a characteristic curve, for which the Hall output is 0 V, the magnetic flux density B in the perpendicular direction should be 0. The broken lines B1, B2, B3 . . . indicating magnetic fluxes are plotted so that this is satisfied approximately.

When the magnetic field detecting section 2 is slid, keeping the operation distance h, in the case where the magnetic field detecting section 2 is far on the left side from the origin x=0, since the magnetic flux density B in the up and downward direction is 0, the Hall output is 0 V. When the magnetic field detecting section 2 is slid to the right, Hall outputs of −0.2 V, −0.1 V, 0 V, 0.1 V and 0.2 V are produced at points $P_1$, $P_2$, $P_3$, $P_4$ and $P_5$, respectively. When it is slid further to the right, Hall outputs of 0.2 V, 0.1 V, 0 V, −0.1 V and −0.2 V are produced at points $Q_1$, $Q_2$, $Q_3$, $Q_4$ and $Q_5$. Hall outputs greater than 0.2 V are produced between $P_5$ and $Q_1$. The Hall output reaches 0.3 V, its output is considered saturated.

In this case, a method, using the sensor to cause such result that switching operation takes place at the Hall output of 0 V, should be avoided for a method used in practice, because the operation becomes unstable. This is for preventing that switching operation takes place in this way, because it takes place due to the fact that the Hall element output is 0 also in the situation where the magnetic field detecting section 2 is far on the left side from the y-axis. For this reason, in the present invention, as indicated in FIG. 1, a bias voltage 4 is applied to the Hall element 5, intending that switching operation takes place, when the sum of the bias voltage and the Hall output is 0. As a concrete example, supposing that a bias voltage of −0.05 V is added to the Hall output, V curves represented by the solid lines C3 and C6 in FIG. 5 are −0.5 V curves, while −0.1 V curves represented by the solid lines C2 and C7 are −0.15 V curves. As described above, the output is displaced by −0.05 V for all the curves. Consequently 0.05 V curves represented by the broken lines C10 and C20 are 0 V curves.

As described above, the operation in a state where the bias voltage is applied is effected as follows. That is, in the case where the magnetic field detecting section 2 is on the left side of the y-axis, due to the fact that the bias voltage of −0.05 V is added to the Hall output of 0 V, the resultant output is −0.05 V. Next, when the magnetic field detecting section 2 is slid to the point $P_1$, since −0.05 V is added to −0.2 V of C1, the resultant output in this case is −0.25 V. In the same way, the resultant output in the case where it is slid to the point $P_2$ is −0.15 V and the resultant output in the case where it is slid to the point $P_3$ is −0.05 V. At the point where the magnetic field detecting section 2 intersects with the 0.05 V curve represented by the broken line C10 the resultant output is 0 V and the polarity of the signal generated by the Hall element switches and becomes a positive. The output Hall element 5 signal stays positive and remains that way until the magnetic field detecting section 2 is slid further to the right and passes through the points $Q_1$ and $Q_2$ and past broken line C20. When the magnetic field detecting section 2 is slid to the right to arrive at the points $Q_3$, $Q_4$ and $Q_5$, the resultant output signal from the Hall element 5 goes negative will release a switch set by a positive signal.

In this way, since the switching operation is maintained, as far as the magnetic field detecting section 2 is slid in the region between the broken lines C10 and C20, it is possible to surely obtain a wide switching operation margin. Owing to the secured wide switching operation margin, a sure operation as a position sensor is possible and thus it is possible to stop the examined body at a predetermined position. In this regard, that the switching operation margin is narrow may give rise to a fatal inconvenience that a load having a great inertia passes over the region without giving rise to switching operation. Further, since the 0.05 V curves represented by the broken lines C10 and C20 are approximately vertical, i.e. they can have an almost ideal form, even if the magnetic field detecting section 2 is displaced in the direction of the y-axis, i.e. even in the case where the operation distance h between the magnetic field generating section 1 and the magnetic field detecting section 2 varies, it is possible to suppress deviations of the detection point in the slide direction to small values and thus to improve the detection precision, so that it is possible to use a great operation distance h. In this respect, in the case where the permanent magnets constituting the magnetic field generating section are closely adhered in one body without gaps, since the 0 V curves are inclined remarkably outward, even if a suitable bias voltage is applied thereto, it is difficult to obtain approximately vertical almost ideal 0 V curves and thus it is not possible to have a great operation distance h.

For the reason why ideal 0 V curves as described above can be obtained, it can be cited that the 0 V curves represented by the solid lines C3 and C6 are slightly inclined outward, which is caused by the fact that the lengths $L_1$ and $L_3$ of the second and the third permanent magnet 7 and 8 are set at a value smaller than the length $L_1$ of the first permanent magnet 6 and that the gaps D is set between $L_1$ and $L_2$. In the present embodiment, in the case where the direction of the current flowing through the Hall element 5 in the magnetic field detecting section 2 is reversed, the sign of all the characteristic curves is inverted. In this situation, +0.05 V is applied as the bias voltage. Together therewith, all the outputs outputted in the switching operation region between the broken lines C10 and C20 become negative.

It is possible to decrease the amount of iron powder attracted from the environment by accommodating the permanent magnets 6, 7 and 8 in the non-magnetic case 9 as in the present embodiment. Even if iron powder is attracted to the case 9 it is relatively easy to remove. Further, in the case where a ferromagnetic material such as soft steel, etc. is used for the mounting plate 10, since electromotive force of the permanent magnets is almost not consumed in the soft iron and the whole electromotive force acts on the upper surface in the permanent magnets, a great operation distance h can be used. Furthermore, the mounting plate 10 is mounted in many cases on steel material and thus using soft steel, it is possible to reduce variations in the magnetic field by the mounting.

Further, according to the embodiment indicated in FIG. 1, switching operation is obtained at two points (C10, C20), responding to displacement of the magnetic field detecting section 2 in the left and right directions with respect to the first permanent magnet 1, i.e. from the sides of the second and the third permanent magnet 7 and 8 (switching operation, which is symmetric in the left and right directions). However, depending on the field of utilization, there may be a case where it is sufficient to obtain switching operation at one point, responding to displacement in either one of the directions.

Figure 14:
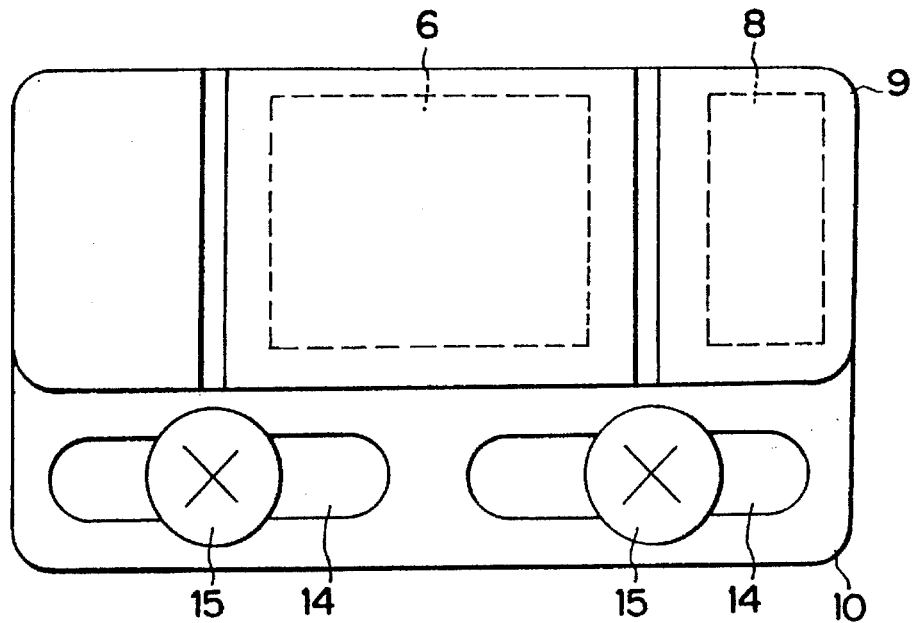
FIGS. 14A and 14B are plan views showing modified examples of the embodiment indicated in FIG. 10
Figure 14:
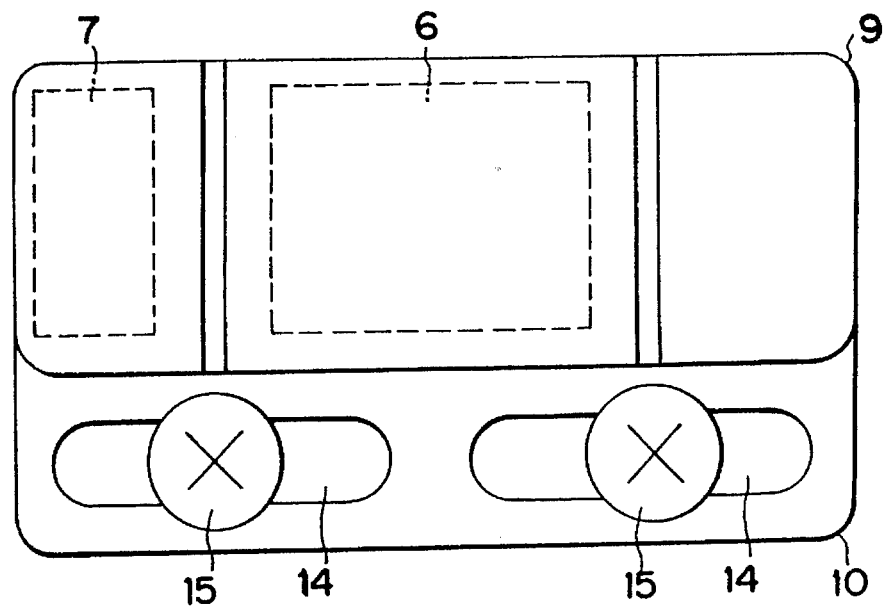

In such a case, it is sufficient to dispose the second or the third permanent magnet 7 or 8, as indicated in FIG. 14A or 14B.

Figure 9:
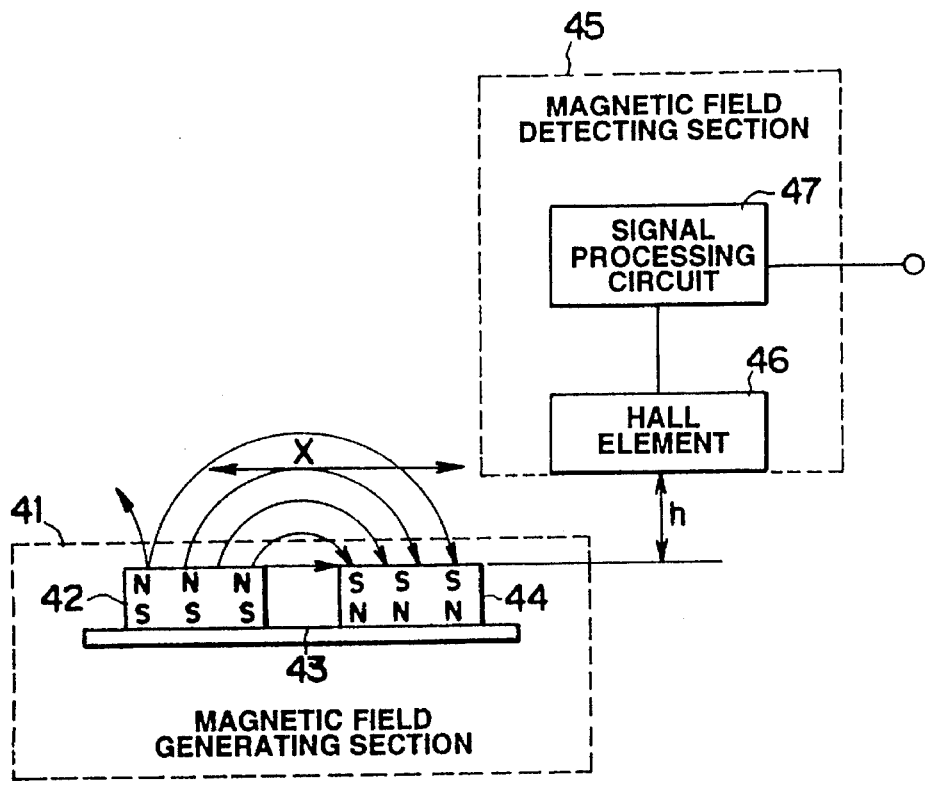
FIG. 9 is a schematic diagram showing the construction of another embodiment of the sensor according to the present invention.

FIG. 9 shows an embodiment of the linear displacement detecting Hall effect type sensor according to the present invention, in which reference numeral 41 is a magnetic field generating section. This magnetic field generating section 41 has a first permanent magnet 42 and a second permanent magnet 44 aligned in displacement direction X, combined with the first permanent magnet 42 through a magnetic body 4, and magnetized so as to have a polarity opposite to that of the first permanent magnet 42. A magnetic field detecting section 45 is slid in the displacement direction X relatively with respect to the magnetic field generating section 41. The invention includes a Hall element 46 that detects the magnetic field generated by the magnetic field generating section 41, while keeping a constant operation distance h, to output electric signals. 47 is a signal processing circuit for processing detection signals from the Hall element 46. A semiconductor thin film such as e.g. InSb is used for the Hall element 46 constituting the magnetic field detecting section 45. The Hall element 46 detects displacement of the examined body by detecting the magnetic field generated by the magnetic field generating section 1 by Hall effect to output electric signals (DC voltage or DC current in many cases).

Owing to the Hall effect explained previously, in FIG. 9, it is possible to output a Hall voltage Vh, i.e. an electric signal, approximately proportional to the magnetic flux density B (Gauss) generated by the first and the second permanent magnets 42 and 44 by sliding the Hall element 46 in the magnetic field detecting section 45 in the displacement direction X relatively with respect to the magnetic field generating section 41, while keeping a constant operation distance h therefrom, passing through the magnetic flux. In this way it is possible to detect displacement of the examined body. Recently such Hall elements and in particular small size Hall elements (e.g. 2.5 mm×1.5 mm×0.6 mm in outer size) are easily available. On the other hand, recently cheap magnets having a high magnetic force and a high coercive force are available for the first and the second permanent magnets 2 and 4 constituting the magnetic field generating section 1. Ferrite type magnets having satisfactory characteristics and arbitrary shapes are available cheaply.

Figure 10:
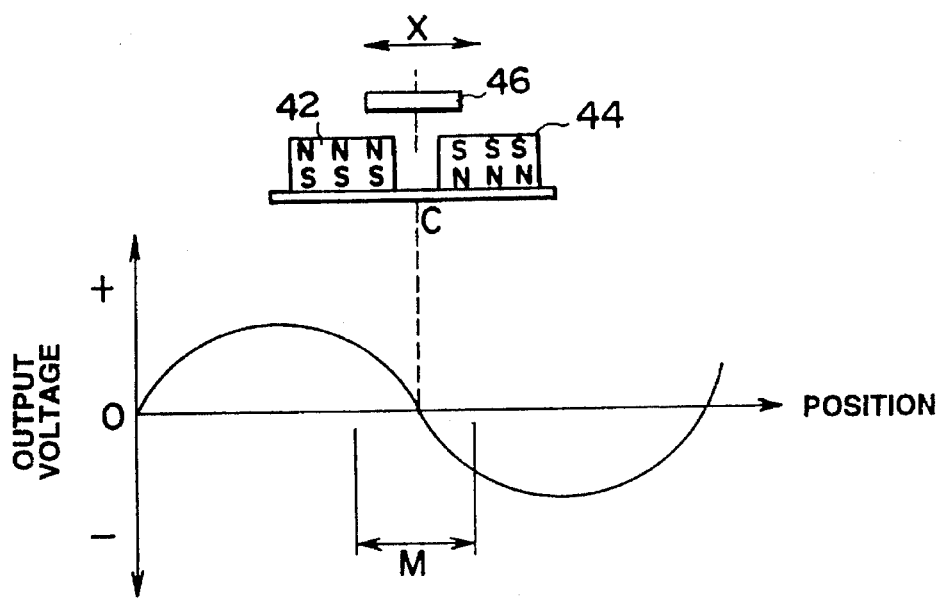
FIG. 10 is a diagram for explaining the working principle of the sensor indicated in FIG. 9.

FIG. 10 is a diagram for explaining the working principle of the present embodiment. In the case where the magnetic field detecting section 45 is slid in the displacement direction X, while keeping a constant operation distance h, when the Hall element 46 is located at the middle position C between the first permanent magnet 42 and the second permanent magnet 44, since the direction of the flux generated by the first permanent magnet 42 and that generated by the second permanent magnet 44 are opposite to each other so that they cancel each other, the Hall voltage Vh detected by the Hall element 46, i.e. the output voltage thereof, is 0. When the Hall element 46 is slid from this position to the left in the figure, since the magnetic flux of the first permanent magnet 42 passes therethrough upward, the Hall element 46 detects a positive Hall voltage Vh (output voltage). Then, when the Hall element 46 is slid to the right in the figure, since the magnetic flux of the second permanent magnet 44 passes therethrough downward, the Hall element 46 detects a negative Hall voltage Vh (output voltage). As the result, an S-shaped output curve as indicated in the figure is obtained, corresponding to the sliding position of the Hall element 46. This output curve varies almost linearly in a region M in the neighborhood of the middle position C. Consequently linear output characteristics are obtained by combining movement of the Hall element 46 at the middle position C with the Hall voltage varying continuously approximately linearly. The polarity of + or − of the output voltage can be easily inverted in an electronic circuit, if necessary.

Figure 11:
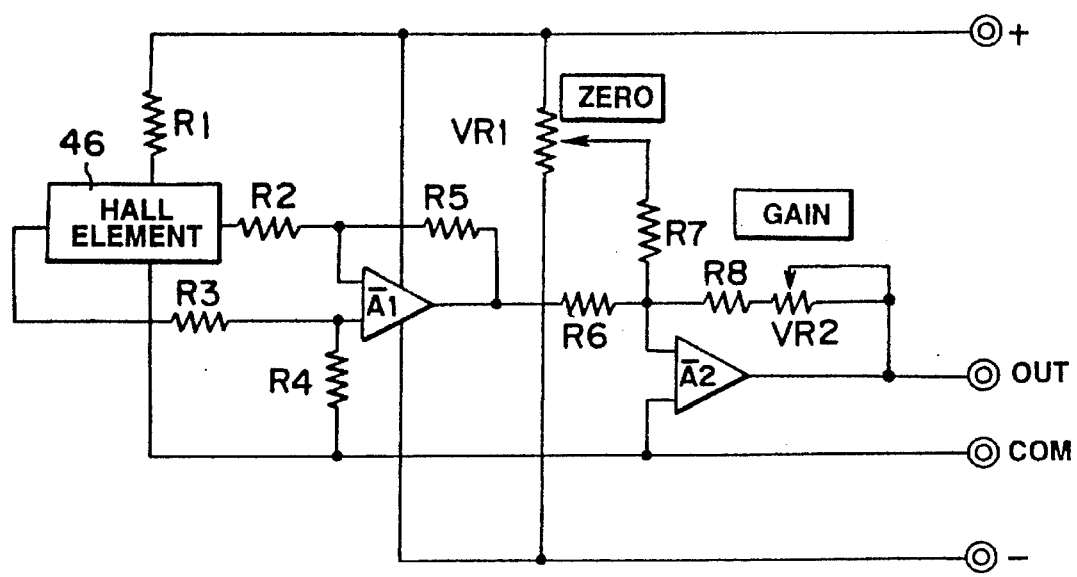
FIG. 11 is a circuit diagram showing an example of the signal processing circuit used in the embodiment indicated in FIG. 9.

FIG. 11 shows an example of the signal processing circuit 47, in which R1 to R8 are resistors, VR1 and VR2 are variable resistors, A1 and A2 are differential amplifiers. The Hall voltage detected by the Hall element 46 is inputted to the differential amplifier A1. After it has been converted into a signal in reference to a COM potential, it is subjected to 0 adjustment, based on VR1, by the differential amplifier A2 and gain adjustment, based on VR2, to obtain an output voltage at an OUT terminal. As an example, the output voltage having a value in a region between 1 V and 5 V is obtained.

Figure 12:
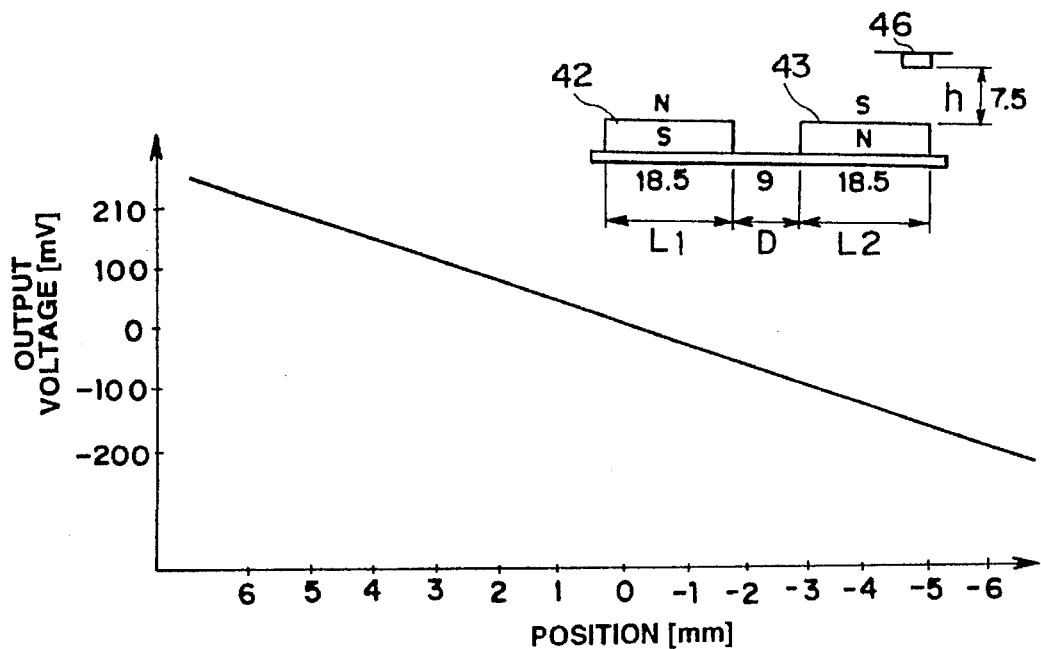
FIG. 12 is an output characteristic diagram indicating a first experimental result of the embodiment indicated in FIG. 9.
Figure 13:
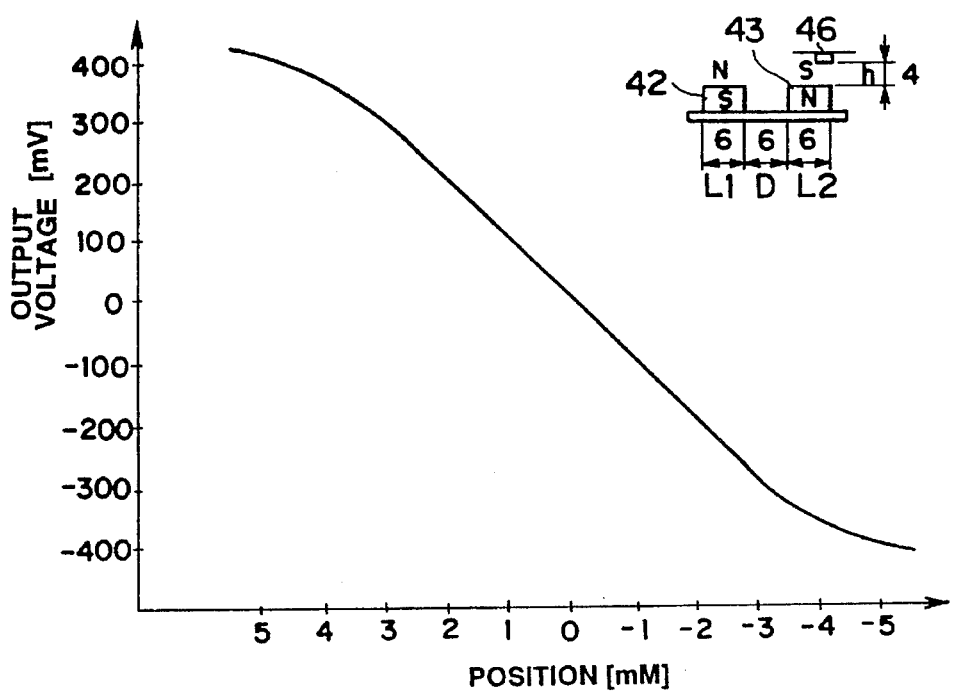
FIG. 13 is an output characteristic diagram indicating a second experimental result of the embodiment indicated in FIG. 9.

FIG. 12 shows a first experimental result in the present embodiment, in which output characteristics are shown, in the case where the lengths L1 and L2 of the first and the second permanent magnet 42 and 44 constituting the magnetic field generating section 41, the gap D between the two magnets 42 and 44, and the operation distance h are set at the dimensions as indicated in the figure. The abscissa represents the slide position (mm) of the Hall element 46 and the ordinate indicates the output voltage (mV). On the other hand, FIG. 13 shows a second experimental result in the present embodiment, in which output characteristics are shown, in the case where the lengths L1 and L2 of the first and the second permanent magnet 42 and 44 constituting the magnetic field generating section 41, the gap D, and the operation distance h are set at the dimensions as indicated in the figure. In either one of FIGS. 12 and 13 linear output characteristics are obtained.

As described above, according to the present embodiment, since cheap products of high performance are easily available for the permanent magnets 42 and 44 and the Hall element 46, cost-down can be intended by combining the first and the second permanent magnet 42 and 44 with the Hall element 46. Further, since displacement of an examined body can be detected without complicated circuit construction by combining the permanent magnets 42 and 44 with the Hall element 46, it is possible to realize a small size linear displacement sensor.

Furthermore it is possible to obtain a wide linear output region by using powerful permanent magnets for the first and the second permanent magnets 42 and 44 constituting the magnetic field generating section 41 and a large gap therebetween. On the other hand, it is possible to obtain a smaller size linear displacement sensor by using small size powerful permanent magnets for the permanent magnets 42 and 44 and setting the gap therebetween at a small size.

There are many methods for means for applying the bias voltage to the output of the Hall element in the embodiment indicated in FIG. 1. However, since it is not necessary to explain them specifically, explanation thereof is omitted.

As explained above, according to the present invention, even in the case where the operation distance between the magnetic field generating section and the magnetic field detecting section varies, it is possible to suppress deviations of the detection position in the slide direction to small values and further to increase the operation distance. Further the sensor according to the present invention is suitable for detecting linear displacements and it is possible to obtain a small size cheap sensor using a simple circuit construction.

What is claimed is:

1. A magnetic position detector including:
    a magnetic field generating element including first, second and third longitudinally axially aligned magnets, said first magnet having opposed ends, said second magnet being adjacent to one opposed end of said first magnet, said third magnet being adjacent the other opposed end of said first magnet, said first magnet having a longitudinal face with a selected magnetic polarity, said second and third magnets having longitudinal faces adjacent said longitudinal face of said first magnet with a magnetic polarity opposite the polarity of said adjacent longitudinal face of said first magnet, and said magnets being spaced apart from each other so as to define inter-magnet gaps between said magnets; and
    a magnetic field detecting assembly located adjacent said magnetic field generating element, said magnetic field generating element and said magnetic field detecting assembly being configured to shift positions relative to each other along a line of travel parallel to the longitudinal axis of said magnetic field generating element, said magnetic field detecting assembly including a Hall element positioned to detect magnetic fields generated by said magnetic field generating element magnets, said Hall element producing an output signal representative of the magnetic fields, and a power supply for providing a bias voltage to the output signal produced by said Hall element, said power supply bias voltage being adjusted so as to cause said Hall element to produce a biased output signal such than when said Hall element crosses positions subtended by said magnetic field generating element inter-magnet gaps, said output signal changes polarity.

2. The magnetic position detector of claim 1, wherein said first, said second and said third permanent magnets are held in one body.

3. The magnetic position detector of claim 2, wherein said magnetic field generating element first magnet is of a first selected length and said magnetic filed generating element second and third magnets are of a second selected length different from the length of said first magnet.

4. The magnetic position detector of claim 3, wherein the magnetic field generating element first magnet has a length greater than the length of said magnetic field generating element second and third magnets.

5. The magnetic position detector of claim 1, wherein said first, said second and said third magnets are accommodated in a non-magnetic case and said case is disposed on a mounting plate.

6. The magnetic position detector of claim 5, wherein said mounting plate is made of a ferromagnetic material.

7. The magnetic position detector of claim 5, wherein marks indicating the polarity switched region of the Hall element output signal are provided on said non-magnetic case.

8. The magnetic position detector of claim 7, wherein said magnetic field generating element first magnet is of a first selected length and said magnetic filed generating element second and third magnets are of a second selected length different from the length of said first magnet.

9. The magnetic position detector of claim 8, wherein said magnetic field generating element first magnet has a length greater than the length of said magnetic field generating element second and third magnets.

10. The magnetic position detector of claim 5, wherein oblong mounting holes are formed in said mounting plate.

11. The magnetic position detector of claim 5, wherein said magnetic field generating element first magnet is of a first selected length and said magnetic filed generating element second and third magnets are of a second selected length different from the length of said first magnet.

12. The magnetic position detector of claim 11, wherein said magnetic field generating element first magnet has a length greater than the length of said magnetic field generating element second and third magnets.

13. The magnetic position detector of claim 1, wherein said magnetic field generating element first magnet is of a first selected length and said magnetic filed generating element second and third magnets are of a second selected length different from the length of said first magnet.

14. The magnetic position detector of claim 13, wherein said magnetic field generating element first magnet has a length greater than the length of said magnetic field generating element second and third magnets.

* * * * *

UNITED STATES PATENT AND TRADEMARK OFFICE
CERTIFICATE OF CORRECTION

PATENT NO. : 5,493,216

DATED : February 20, 1996

INVENTOR(S) : Yukihiro ASA

It is certified that error appears in the above-indentified patent and that said Letters Patent is hereby corrected as shown below:

On the title page, item [54] and in column 1; change "MAGNETIC POSITION DETECTOR" to ---MAGNETIC POSITION DETECTOR HAVING A MAGNETIC FIELD GENERATING ELEMENT INCLUDING FIRST, SECOND AND THIRD LONGITUDINALLY AXIALLY ALIGNED MAGNETS---.

Column 10, line 20; change "than" to ---that---.

Column 10, line 28; delete "magnetic field generating element".

Column 10, line 29; delete "magnetic filed generating element".

Column 10, line 34; delete "magnetic field generating element".

Column 10, line 35; delete "magnetic field generating element".

Column 10, line 49; delete "magnetic field generating element".

Column 10, line 50; delete "magnetic filed generating element".

Column 10, line 55; delete "magnetic field generating element".

Column 10, lines 56 and 57; delete "magnetic field generating element".

UNITED STATES PATENT AND TRADEMARK OFFICE
CERTIFICATE OF CORRECTION

PATENT NO. : 5,493,216
DATED : February 20, 1996
INVENTOR(S) : Yukihiro ASA

It is certified that error appears in the above-indentified patent and that said Letters Patent is hereby corrected as shown below:

Column 10, line 61 ; delete "magnetic field generating element".

Column 10, lines 62 and 63; delete "magnetic filed generating element".

Column 10, line 67; delete "magnetic field generating element".

Column 11, lines 1 and 2; delete "magnetic field generating element".

Column 11, line 4; delete "magnetic field generating element".

Column 11, lines 5 and 6; delete "magnetic filed generating element".

Column 12, line 2; delete "magnetic field generating element".

UNITED STATES PATENT AND TRADEMARK OFFICE
CERTIFICATE OF CORRECTION

PATENT NO.   : 5,493,216
DATED        : February 20, 1996
INVENTOR(S)  : Yukihiro ASA It is certified that error appears in the above-indentified patent and that said Letters Patent is hereby corrected as shown below:

Column 12, lines 3 and 4; delete "magnetic field generating element".

Signed and Sealed this

Sixth Day of August, 1996

Attest:

BRUCE LEHMAN

*Attesting Officer*       *Commissioner of Patents and Trademarks*